United States Patent [19]

Schopf et al.

[11] 4,321,279

[45] Mar. 23, 1982

[54] BUTTERED TABLE SYRUP IN POLYOLEFIN BOTTLE

[75] Inventors: Larry D. Schopf, Battle Creek; Jerome K. Sakowicz, Springfield; Hugh L. Trenk, Augusta, all of Mich.

[73] Assignee: General Foods Corporation, White Plains, N.Y.

[21] Appl. No.: 197,837

[22] Filed: Oct. 17, 1980

[51] Int. Cl.³ .......................... A23L 1/09; A23L 3/34; B65B 29/00
[52] U.S. Cl. .................................. 426/106; 426/324; 426/330; 426/654; 426/658; 426/542; 426/546; 426/544
[58] Field of Search ............... 426/658, 654, 613, 106, 426/324, 330, 392, 397, 542, 546, 544, 543

[56] References Cited

U.S. PATENT DOCUMENTS

| | | | |
|---|---|---|---|
| 3,057,734 | 10/1962 | Pader | 426/658 |
| 3,282,707 | 11/1966 | Topalian et al. | 426/658 |
| 3,362,833 | 1/1968 | Smith | 426/658 |
| 4,073,963 | 2/1978 | Daggy | 426/658 |

*Primary Examiner*—Steven L. Weinstein
*Attorney, Agent, or Firm*—Mitchell E. Alter; Daniel J. Donovan; Thomas R. Savoie

[57] ABSTRACT

A buttered table syrup is provided in a polyolefin bottle. An emulsifier is selected which provides a storage stable product. The product does not develop an objectionable off-flavor when packaged in a polyolefin container. The emulsifier has three components: locust bean gum; carageenin; and pectin.

13 Claims, No Drawings

BUTTERED TABLE SYRUP IN POLYOLEFIN BOTTLE

TECHNICAL FIELD

This invention relates to bottled buttered table syrup and to a method of bottling a buttered table syrup.

BACKGROUND OF INVENTION

In recent years there have been developed buttered table syrups which are stable and homogeneous. By the term "buttered table syrup" is meant a table syrup product having a sugar solids content of at least 65% by weight and butter in an amount of 1–5% by weight. By the term "butter" is meant whole butter or its equivalent such as butter fat or anhydrous butter oil.

Various emulsifiers are reported in the patent literature as being useful for buttered table syrups.

Pader, U.S. Pat. No. 3,057,734, discloses the use of water soluble proteins, gum arabic, and edible algin derivatives. For maximum emulsion stability, Pader prefers the polyhydric alcohol esters of alginic acid, e.g. propylene glycol ester of alginic acid. Pader also discloses that several other materials are not effective. Included among these are: fatty acid based emulsifiers such as "Spans" and "Tweens"; and gums other than gum arabic, gum arabic being useful with casein and its derivatives.

Topalian, U.S. Pat. No. 3,282,707 discloses the use of gum ghatti to stabilize a sugar syrup, and Smith, U.S. Pat. No. 3,362,833 discloses the use of gum ghatti and lecithin for the same purpose.

Daggy, U.S. Pat. No. 4,073,963, discloses the use of an emulsifier system for a buttered table syrup in which sodium stearoyl-2-lactylate and sorbitan monostearate are used. Daggy reports that several other materials are not useful. Among these are: xanthan gum, carrageenin gum, locust bean gum, guar gum, and pectin.

Difficulties have arisen, when stabilizers-emulsifiers such as carrageenan or lecithin alone are employed in stabilizing products such as table syrups, which must of necessity undergo prolonged storage in bottles or other containers prior to consumer use. Separation of the oil and aqueous phases has been noted when a table syrup employing an oil phase such as butter remains on the shelves of the retail outfit for several months. In many instances, there is at least partial separation of phases, which phases cannot be completely put into solution by the consumer by shaking the bottle. This separation constitutes an important disadvantage of buttered table syrups and has met with consumer dissatisfaction.

While the previously known emulsifiers are quite useful in providing storage-stable products in glass containers, a problem arises when these otherwise storage-stable buttered table syrup products are bottled in polyolefin bottles such as polypropylene or polyethylene bottles. We have found that, when a stable buttered table syrup is bottled in a plastic bottle of this type, a substantial and objectionable off-flavor develops after a relatively short period of time.

It is an object of the present invention to provide a pourable, stable table syrup which does not cause an objectionable off-flavor when bottled in a polyolefin bottle. It is a further object of the invention to provide a method of bottling, in a polyolefin bottle, a stable buttered table syrup which does not develop an objectionable off-flavor.

The present invention should provide a stabilized emulsion has improved stability against separation over prolonged periods of storage and is suitable for use as table syrup, topping, or the like.

The emulsion should further exhibit marked resistance to separation under repeated freeze-thaw cycles.

BRIEF SUMMARY OF THE INVENTION

The foregoing and other objects which will be apparent to those of ordinary skill in the art are achieved in accordance with the present invention by providing a bottled buttered table syrup comprising a polyolefin bottle containing a table syrup, said table syrup containing at least about 65% by weight sugar solids, butter in an amount of 1–5% by weight based on the weight of the syrup, and from 0.05 to 0.4% by weight of an emulsifier, said emulsifier comprising from 0.01 to 0.2% by weight, based on the weight of the syrup, of locust bean gum, from 0.01 to 0.2% by weight, based on the weight of the syrup, of carrageenin, and from 0.01 to 0.2% by weight, based on the weight of the syrup, of pectin, and by providing a method of bottling a table syrup in a polyolefin bottle which comprises filling a polyolefin container with said table syrup, and closing said container.

DETAILED DESCRIPTION

The buttered table syrups to which the present invention relate are known per se and are fully described in the prior art patents mentioned above, the disclosures of which are herein incorporated by reference. In general, the syrup is pourable at normal room temperature and contains at least 65% by weight sugar solids, from 1–5% butter, an emulsifier or stabilizer to provide a stable oil-in-water emulsion, and various conventional additives such as color, flavor, and the like.

The emulsifier system of the present invention includes three components: locust bean gum, carrageenin, and pectin, each of which, of course, is of food grade. Locust bean gum is used in an amount of 0.01 to 0.2% preferably 0.03 to 0.1% by weight, based on the weight of the table syrup. Carrageenin is used in an amount of 0.01 to 0.2%, preferably 0.03 to 0.1% by weight, same basis. Pectin is used in an amount of 0.01 to 0.2%, preferably 0.02 to 0.1% by weight, same basis. The total amount of the three components is 0.05 to 0.4%, preferably 0.1 to 0.3% by weight, same basis. The emulsifier system is conveniently provided by using a prepared aqueous, food grade, emulsifier such as "Frimulsion 6G", a commercial product containing about 26% by weight locust bean gum, about 20% by carrageenin, and about 14% by weight pectin.

It is primarily intended that the stable emulsion, which is an important part of the present invention, be adapted for food use, specifically for use as a table syrup, the quantities of some of the ingredients therein will be subject to variations in accordance with the particular use to which the syrup is to be adapted and the grade and flavor of the product to be manufactured. Table syrup in its most preferred form is a cane-corn syrup blend in which, in the present invention, butter and maple syrup or maple flavor are incorporated; it will be apparent that the amount of butter in the syrup, as well as the amount of maple syrup or maple flavor will vary in accordance with consumer preference and the retail price at which the syrup is to be marketed. In addition, if the syrup is to be utilized to pour over ice cream and for general fountain use, as well as a topping for pancakes, waffles and the like, it may be desirable to increase the sugar solids content of the aqueous phase of the emulsion well beyond 65 percent up to about 80 percent or more, providing the syrup or topping is still pourable.

Consequently, while in its most preferred form the syrup is contemplated as having about 2 percent butter or other oil by weight of the emulsion, the amount of oil will vary to a preferred range of about 1 to 5 percent to a broad range of about 1 to 10 percent. In addition, where maple syrup is used as a flavoring ingredient, the most preferred amount of such maple syrup used is presently about 2 percent by weight of the finished emulsion. It will, of course, be apparent that a more expensive product would incorporate greater amounts of maple syrup, which is relatively expensive compared to a cane-corn syrup blend. Artificial flavors may be used to replace the costly maple syrup. While, as stated, the percentage of sugar solids in the aqueous phase will generally be at least about 65 percent, increased viscosity requirements will result in increased sugar content. The sugar content should not be so high that crystallization will occur at conventional storage temperatures or that the syrup will become nonpourable and must and must be spooned from its container.

One of the properties of polyolefin material is that it is a poor gas barrier. Therefore the protection of the fat particles from oxidation must be accomplished to prevent stale flavor notes.

The emulsifier system of the present invention provides both a stable oil and water emulsion as well as preventing the development of off-flavors. The following hypothesis is used to explain this latter phenomena of the invention. However, the hypothesis of the existence and mechanism by which the invention prevents the development of off-flavor is not designed to limit the scope of the present invention, but is advanced only as a means of explaining the effects produced.

The emulsifier of this invention has the ability to stabilize a homogeneous buttered syrup with much larger fat particle sizes than conventional propylene glycol ester of alginic acid. By obtaining larger fat particles, the surface area to volume ratio of fat is reduced. This may act to decrease the available sight for oxidation of the fat. In addition, the emulsifier system of the present invention may have antioxident powers through physically protecting (or coating) the fat particles or through chemically altering or binding precursors that form the compounds responsible for the stale flavor notes.

It is presently believed that a combination of any two of the three emulsifiers, carrageenin, pectin, and locust bean will provide product stability and eliminate any off-flavor notes. Emulsions made with conventional prior art emulsifiers, such as propylene glycol alginate, produce particles sizes of the range of one micron. An emulsion made with a commercially available pectin marketed by the Hercules Company, known as HMBB Rapid Set Pectin produces an average fat particle size of 7 microns. An emulsion made with commercially avialable carrageenan also from Hercules, known as Type J, produces an average particle size of approximately one micron. An emulsion made with a commmercially available combination of locust gum and carrageenan, marketed by the Hercules Company and sold under the Trademark of Genulacta PL-93 had an average particle size of seven microns. It has been determined that the average particle size using the "Frimulsion 6G" emulsifying system is in the range of 7 microns. It is therefore believed that it is desirable to have an average fat particle size of greater than 4 microns and more preferably greater than 6 microns but less than 9 microns.

A preferred method of preparing the buttered table syrup is as follows. A gum pre-solution is made by dispersing and dissolving the emulsifier in soft water at about 49° C. to 60° C. (approximately 120°–140° F.) and held for about one hour to solubilize the emulsifiers with the weight of the water being about 10 to 100 times the total weight of the locust bean gum, carrageenin and pectin. A blend of sugar syrups, flavor, etc, is made up and heated to a temperature of about 71° C. to 82° C. (approximately 160°–180° F.). The gum pre-solution and sugar syrup blend are admixed and blended for about 5–10 minutes. Melted whole butter, heated to a temperature of about 60° C. (approximately 140° F.) maximum, is then added and blended for an additional 5–10 minutes. The blend is then heated to a temperature of about 71° C. to 85° C. (approximately 160°–185° F.), adjusted, if necessary, to a desired sugar solid content by the addition of water, and homogenized at a single stage homogenizer pressure of approximately 4000 psi. The product is then bottled at about 77° C. to 80° C. (approximately 170°–175° F.). These are conventional steps used by the table syryp industry. Deviations from anyone of the listed processing conditions is within the contemplation of this invention.

EXAMPLE I

The procedure described above is followed. The sugar solids content is adjusted to 70°–71° Brix by the addition of water.

The following formulation is used:

| Gum presolution | Parts by wt |
| --- | --- |
| Emulsifier System (Frimulsion 6G) | 0.200 |
| 26 wt % locust bean gum | |
| 20 wt % carrageenin | |
| 14 wt % pectin | |
| Soft Water | 3.128 |
| Sugar Blend | |
| Liquid sugar syrup | 73.600 |
| 42 DE corn syrup | 20.527 |
| Flavor and color | 0.400 |
| Sodium Benzoate | 0.050 |
| Citric Acid | 0.016 |
| Tri sodium citrate | 0.069 |
| Whole Butter | 2.000 |
| | 100.000 |

The product is bottled in two types of containers: polyacrylonitrile, and polypropylene. As a comparison, a similar table syrup is prepared using 0.2% of a commercially available propylene glycol ester of alginic acid, known as PGA for short notation and "Kelcoloid O" as the tradename, and bottled in the two types of plastic bottles. Neither product produces an objectionable off-taste when stored in the polyacrylonitrile container. An objectionable off-flavor develops in the table syrup in the polypropylene container stabilized with propylene glycol ester of alginic acid. However, no such off-flavor is produced in the table syrup in the polypropylene container stabilized with the three-component stabilizer system of the present invention.

EXAMPLE II

The following seven systems were tested to develope a theory of the present invention. The reasoning behind choosing systems 1–4 was to store these systems under various conditions and determine whether the stale flavor development is due to the oxidation of butter fat or a combination reaction and whether ascorbyl palmitate, an antioxidant and weighing agent, would act to inhibit formation of these off-notes. Systems 5, 6, and 7 are attempts at finding out how each ingredient in the Frimulsion preparation functions separately and to determine if use of only one or two of its more functional ingredients could produce a system with similarly improved flavor stability.

Beakers labelled "B" contained 146 polypropylene beads each.

(5) Repetition of step 4 five additional times to maximize the concentration of the designated gas inside the desiccator.

(6) Quickly removing the hose from the desiccator and plugging the glass tube in the top with a secondary rubber stopper while maintaining a flow of the same gas as contained in the desiccator over the glass tube opening during the execution of this step.

(7) Repeating steps 3–7 with the remaining three

TABLE 1

|  | System #1 | System #2 | System #3 | System #4 | System #5 | System #6 | System #7 |
| --- | --- | --- | --- | --- | --- | --- | --- |
| Liquid Sugar and Corn Syrup | 90.5 | 92.0 | 90.5 | 90.5 | 92.0 | 92.0 | 92.0 |
| Butter | 2.0 | 2.0 | — | 2.0 | 2.0 | 2.0 | 2.0 |
| PGA | 0.40 | — | 0.40 | 0.40 | — | — | — |
| Frimulsion 6G | — | 0.10 | — | — | — | — | — |
| Pectin | — | — | — | — | 0.20 | — | — |
| Carrageenan | — | — | — | — | — | 0.20 | — |
| Genulacta PL-93 | — | — | — | — | — | — | 0.20 |
| Preservatives | 0.09 | 0.09 | 0.09 | 0.09 | 0.09 | 0.09 | 0.09 |
| Buffering Agent | 0.12 | 0.12 | 0.12 | 0.12 | 0.12 | 0.12 | 0.12 |
| Acidulent | 0.01 | 0.01 | 0.01 | 0.01 | 0.01 | 0.01 | 0.01 |
| Flavors and Color | 0.17 | 0.17 | 0.17 | 0.17 | 0.17 | 0.17 | 0.17 |
| Salt | 0.3 | 0.3 | 0.3 | 0.3 | 0.3 | 0.3 | 0.3 |
| Water | 6.42 | 5.27 | 8.42 | 6.42 | 5.17 | 5.17 | 5.17 |
| Ascorbyl Palmitate | — | — | — | 0.002 | — | — | — |
| Approximate Totals | 100.00% | 100.00% | 100.00% | 100.00% | 100.00% | 100.00% | 100.00% |

To obtain results in a relative short period of time on a stabilized butter-syrup in plastic, an accelerated controlled environment test was developed. This was accomplished with the aid of four glass desiccators, a vacuum pump, an $O_2$ and a $N_2$ gas source, twenty-four 400 milliliter beakers. The procedure consisted of:

(1) Filling the labelled 400 ml beakers with their respective syrups in amounts predetermined so as to duplicate in the beaker the surface area to syrup volume found in 12 ounce polypropylene bottles.

(2) Placing the beakers in their respective desiccators and sealing the desiccators.

(3) Hooking up tygon tubing between the desiccators, the vacuum pump and the appropriate gas source (either $O_2$ or $N_2$) through the use of a "T" connector.

(4) Evacuating the gas from the desiccator with the vacuum pump and replacing it with either $O_2$ or $N_2$, depending upon the desiccator designation I-IV as follows:

Four desiccators were utilized with the following contents and placed in storage @100° F.

| Desiccator I $O_2$ environment | | Desiccator II $N_2$ environment | | Desiccator III $N_2$ environment | | Desiccator IV $O_2$ environment | |
| --- | --- | --- | --- | --- | --- | --- | --- |
| #1A | #1B | #2A | #2B | #1A | #1B | #2A | #2B |
| #3A | #3B | #5A | #5B | #3A | #3B | #5A | #5B |
| #4A | #4B | #6A | #6B | #4A | #4B | #6A | #6B |

Each beaker contained 74 ml of the indicated syrup. Beaker labelled "A" lacked polypropylene beads while desiccators.

(8) Placing all of the desiccators into storage at 100° F. for a period of three weeks.

The occurence of emulsion spearation in Systems #5 and #6 caused their elimination from the study. In addition, when System #7 was permitted to cool, it formed a stable gel exhibiting very poor flow characteristics. Because of this, System #7 was also eliminated from the study. However, preliminary indications are that when Genulacta PL-93, a commercially available combination of locust bean gum and carrageenan, marketed by Hercules, is employed at a 0.10% by weight basis, a flowable stable syrup is obtained.

Results from the accelerated 140° F. stability study, the one month analysis in the conventional storage study and from the accelerated controlled environment study are recorded in the data section. These results indicate that the stale flavor was not due to migration of monomers from the polypropylene bottle or a reaction with the polypropylene resin. The stale flavor was probably due to oxidation of the butter fat and propylene glycol ester of algenic acid probably did not contribute to this reaction. The addition of 0.002% ascorbyl palmitate significantly reduced production of the oxidized stale flavor. Also indicated was that the presence of sunlight caused the development of an off flavor described as being both stronger and different from the stale note produced under the conditions previously discussed. The presence of ascorbyl palmitate in the sunlight exposed samples also helped reduce the additional off flavors that otherwise developed with sunlight exposure.

DATA SECTION

| Sample Description | 140° F. Storage Evaluated after 2 weeks and 4 weeks | Evaluation of Flavor and Stability Following one Month Storage Under the Following Conditions | | | Controlled O₂ Environment Saturated with H₂O and stored @ 100° F. for a 3 week period | Controlled N₂ Environment Saturated with H₂ and stored @ 100° F. for a 3 week period |
|---|---|---|---|---|---|---|
| | | Room Temperature | 100° F. Contrasted Against a Refrigerated Control | Window Exposure | | |
| #1-A (stored in glass) 0.4% PGA 2.0% Butter | good stability | no change | no change | development of off flavors | good stability sl. stale note developing | good stability clean flavor |
| #1-B (stored in plastic) same as #1-A | — | no change | stale off flavor development | same as above | same as above | same as above |
| #2-A (stored in glass) 0.1% Frimulsion 2.0% Butter | slight separation following 2 week period increasing with time* | no change | no change | similar off flavor as above (but slightly less) | *fair stability - slight sour note developing | slight separation clean flavor |
| #2-B (stored in plastic) same as #2-A | — | no change | slight separation very slight stale flavor note* | same as #1 above | same as above | same as above |
| #3-A (stored in glass) 0.4% PGA 0.0% Butter | good stability | no change | raisin flavor note | no change | clean | clean |
| #3-B (stored in plastic) same as #3-A | — | no change | raisin flavor development | slight raisin note | clean | clean |
| #4-A (stored in glass) system #1 plus 0.002A ascorbyl palmitate | good stability | no change | no change | no change | very slight sour note not stale | clean |
| #4-B (stored in plastic) same as #4-A | — | no change | possibly a slight stale note | slight off flavor note | same as above | clean |

*Note:
Frimulsion used in this study was old. Previously made in using Frimulsion exhibites good stability after 13 months storage

What is claimed is:

1. A bottled buttered table syrup comprising a polyolefin container containing a table syrup, said table syrup containing at least about 65% by weight sugar solids, butter in an amount of 1–5% by weight based on the weight of the syrup, and from 0.05 to 0.4% by weight of an emulsifier, said emulsifier comprising from 0.01 to 0.2% by weight, based on the weight of the syrup, of locust bean gum, from 0.01 to 0.2% by weight, based on the weight of the syrup, of carrageenin, and from 0.01 to 0.2% by weight, based on the weight of the syrup, of pectin.

2. A bottled buttered table syrup according to claim 1 wherein said emulsifier comprises from 0.03 to 0.1% by weight locust bean gum, from 0.01 to 0.1% by weight carrageenin, and from 0.02 to 0.1% by weight pectin, based on the weight of the table syrup.

3. A bottled buttered table syrup according to claim 1 wherein said emulsifier comprises 0.04% by weight locust bean gum; from 0.02% by weight carrageenin, and from 0.03% by weight pectin, based on the weight of the table syrup.

4. A bottled buttered table syrup according to claim 1 wherein said container comprises polypropylene.

5. A bottled buttered table syrup according to claim 1 wherein said sugar solids result from the table syrup containing sugar syrup comprising liquid sugar syrup and corn syrup.

6. A method of bottling a table syrup in a polyolefin container which comprises filling a polyolefin container with a table syrup, said table syrup containing at least about 65% by weight sugar solids, butter in an amount of 1–5% by weight based on the weight of the syrup, and from 0.05 to 0.4% by weight of an emulsifier, said emulsifier comprising from 0.01 to 0.2% by weight, based on the weight of the syrup, of locust bean gum, from 0.01 to 0.2% by weight, based on the weight of the syrup, of carrageenin, and from 0.01 to 0.2% by weight, based on the weight of the syrup, of pectin, and closing said container.

7. A method according to claim 6 wherein said emulsifier comprises from 0.03 to 0.1% by weight locust bean gum; from 0.01 to 0.1% by weight carrageenin, and from 0.02 to 0.1% by weight pectin, based on the weight of the table syrup.

8. A method according to claim 6 wherein said emulsifier comprises from 0.04% by weight locust bean gum; about 0.02% by weight carrageenin, and about 0.03% by weight pectin, based on the weight of the table syrup.

9. A method according to claim 6 wherein said container comprises polypropylene.

10. A method according to claim 6 wherein said buttered table syrup is prepared by the steps of: admixing said locust bean gum, carrageenin, and pectin with water, the weight of water being about 10 to 100 times the total weight of said locust bean gum, carrageenin, and pectin, to form an aqueous emulsifier; admixing a sugar syrup and the aqueous emulsifier to form a sugar syrup-emulsifier admixture; admixing melted butter and the syrup-emulsifier admixture to form a buttered admixture; ahd homogenizing said buttered mixture to form said buttered table syrup.

11. A method according to claim 10 wherein said water is at a temperature of from 120° to 140° F. and wherein said aqueous emulsion is held for a period of time sufficient to solubilize the emulsifiers.

12. A method according to claim 11 wherein said melted butter is at a temperature of not more than 140° F.

13. A method according to claim 12 wherein the buttered admixture is blended for a time sufficient to form a homogeneous admixture and is thereafter heated to a temperature of 170°–185° F., wherein water is added, if necessary, to adjust the sugar solids content to a desired level, and wherein the resulting syrup is maintained at a temperature of 170°–175° F. while being bottled.

* * * * *